United States Patent [19]

Bronowski

[11] Patent Number: 4,621,762

[45] Date of Patent: Nov. 11, 1986

[54] DEVICE FOR BUILDING UP A WORKPIECE BY DEPOSIT WELDING

[75] Inventor: Helmut Bronowski, Heidenheim, Fed. Rep. of Germany

[73] Assignee: J. M. Voith GmbH, Heidenheim, Fed. Rep. of Germany

[21] Appl. No.: 763,427

[22] Filed: Aug. 7, 1985

[30] Foreign Application Priority Data

Aug. 16, 1984 [DE] Fed. Rep. of Germany ....... 3430114

[51] Int. Cl.$^4$ .................. B23K 31/02; B23K 9/04; B23K 37/06; B22D 11/00

[52] U.S. Cl. .................. 228/215; 228/222; 228/119; 219/73.11; 219/76.11; 219/76.12; 164/509; 901/42

[58] Field of Search .......... 228/215, 222, 119; 219/73.11, 73.21, 76.11, 76.12, 125.1; 164/509; 901/42

[56] References Cited

U.S. PATENT DOCUMENTS

| | | | |
|---|---|---|---|
| 3,349,983 | 10/1967 | Huff | 219/125.1 |
| 3,558,846 | 1/1971 | Ujiie | 219/76 |
| 4,233,491 | 11/1980 | Marayama et al. | 219/125.1 |
| 4,349,717 | 9/1982 | Lindow et al. | 228/215 |

FOREIGN PATENT DOCUMENTS

| | | | |
|---|---|---|---|
| 2941849 | 10/1979 | Fed. Rep. of Germany | 164/509 |
| 421269 | 5/1980 | U.S.S.R. | 164/509 |

Primary Examiner—Nicholas P. Godici
Assistant Examiner—Samuel M. Heinrich
Attorney, Agent, or Firm—Albert L. Jeffers; Stephen T. Belsheim

[57] ABSTRACT

A device for building up a workpiece of any shape by deposit welding comprising a support device for the workpiece and a welding head for depositing the filler material. A form shoe is arranged on both sides of the workpiece wall that it being built up. Each form shoe is movable independently from the other one and transverse to the workpiece wall. The welding head is reciprocably mounted between the form shoes. There is provided a device for producing relative movement between the support device with the workpiece and/or the welding head and the form shoes.

5 Claims, 2 Drawing Figures

DEVICE FOR BUILDING UP A WORKPIECE BY DEPOSIT WELDING

BACKGROUND OF THE INVENTION

The invention concerns a device for building up a workpiece exclusively or predominantly by deposit welding.

U.S. Pat. No. 3,558,846 to Ujiie is directed to an apparatus for constructing a vessel having a substantially circular cross section by welding wherein a hollow cylindrical workpiece is produced on a rotary table using a single-piece form shoe extending with two jaws from both sides around the workpiece wall to be built up. Coordinated with the form shoe are several welding heads for deposition of the deposit filler metal. While the workpiece being built up performs a rotary movement, the form shoe and the coordinated welding heads are moved in a direction parallel with the longitudinal axis of the workpiece. All that is possible with this device is the production of regular rotary bodies of equal wall thickness.

Additionally known from the German Pat. No. 29 41 849 is a method for producing structural components by electroslag welding where a multiple part metal form is joined with a preformed workpiece part and a molten pool is produced in the peripherally closed form for supplementing the workpiece. The workpiece shape is given by the metal form so that any variation in the workpiece shape requires another metal form.

The problem to which the invention is directed is to provide a device by which bodies of any shape can be produced by deposit welding. Previously unresolved, this new problem is solved by the present invention.

SUMMARY OF THE INVENTION

The device of the present invention makes it possible to produce workpieces which were previously made by casting, forging, welding from individual components or by machining, because walls of most varying shape and thickness can be created with the form shoes of the present invention. The device can be particularly favorably used in making workpieces with geometrically complex shapes in small batches. Since the form shoes determine the contours of the workpiece walls being built up, a high accuracy of shape is achievable, which is advantageous in cases of stringent requirements wherein a smoothing of the surface may be necessary.

A specific embodiment of the invention will be more fully explained hereafter with the aid of the drawing.

The above-mentioned and other features and objects of this invention and the manner of attaining them will become more apparent and the invention itself will be best understood by reference to the following description of an embodiment of the invention taken in conjunction with the accompanying drawings.

DESCRIPTION OF A SPECIFIC EMBODIMENT

Figure 1:
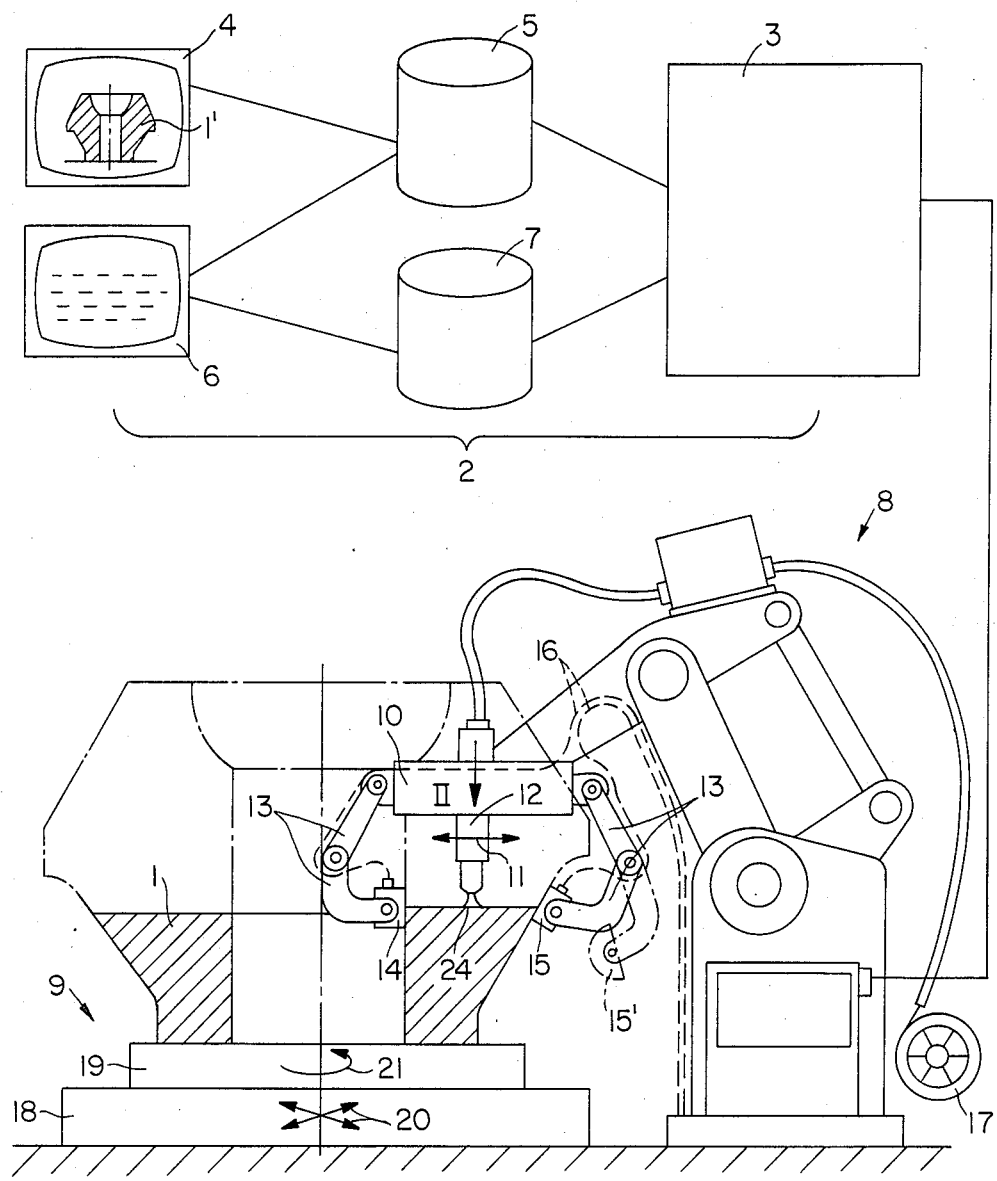
FIG. 1 shows schematically a device for building up a workpiece by deposit welding with the aid of a computer-controlled welding robot.

A CAD/CAM (Computer Aided Design/Computer Aided Manufacturing) system 2 is used in the design, scheduling and fabrication of the workpiece 1 presented in the bottom half of FIG. 1 and being built up. A first operational step covers the design of the workpiece 1' on an interactive video screen 4, aided by a computer 3, under utilization of geometric data contained in a memory 5. A second operational step covers the computer-aided scheduling of the workpiece using an interactive video screen 6 as well as technology values and plans stored in a second data memory 7. The data produced by design and operations scheduling are transmitted by the computer 3, in the form of NC commands, to a welding robot 8 and a support device 9 for the workpiece 1.

The robot 8 is provided with a support 10 for a welding head 12 mounted in a fashion allowing it to reciprocate in the direction of the double arrow 11. Arranged on the support 10 are movable arms 13 each supporting a form shoe 14 and 15. Cooling of the form shoes is effected through cooling water lines 16 indicated by broken lines. The form shoes 14 and 15 can be moved independently from each other with the aid of the arms 13 in the direction of the double arrow 11. The form shoes 14, 15 may also be tilted, raised or lowered. The robot 8 is additionally equipped with a device 17 for feeding the deposit filler metal to the welding head 12.

The support device 9 for the workpiece 1 features a cross table 18 and a rotary table 19. Drives, which are not illustrated, are capable of moving the cross table 18 in two mutually perpendicular directions (double arrows 20) while the rotary table 19 can perform a rotary movement (arrow 21).

Figure 2:
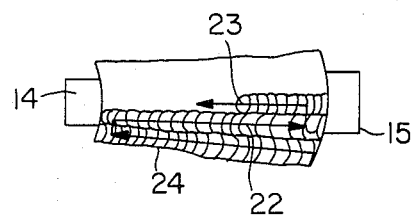
FIG. 2 is a plan view of a workpiece section, presented enlarged and built up by adjacent welding beads, in the direction of arrow II in FIG. 1.

Illustrated in longitudinal section in the drawing, the workpiece 1 is exclusively made by deposit welding, that is, it is built up by a meandering deposition of a bead 22 next to a bead 23 in a horizontal plane (FIG. 2). The welding head 12 performs for that purpose oscillating movements in the direction of the double arrow 11. The amplitude of the oscillating movement is determined by the computer 3 with regard to the width of the workpiece wall 24 being built up. The cooled form shoes 14 and 15 arranged on both sides of the workpiece wall 24 being built up confine the molten pool produced by the welding head 12 and cause its coagulation within the wall cross section. Controlled by the computer 3, the coordination of the form shoes 14 and 15 with the support device 9 determines in conjunction with the stroke of the welding head 12 the dimensions and the contour of the wall cross section being built up. To improve the accuracy of shape and surface finish of the workpiece 1, form shoes 15' such as indicated in FIG. 1 by dash-dotted lines can be used, which are especially adapted to the contour of the workpiece section to be produced. The computer-controlled rotary table 19 performs at the reversing point of the reciprocating movement of the welding head 12 a rotary movement so that the next bead will be deposited just alongside the one just deposited. The control of the welding robot 8 and of the support device 9 safeguards that every unit of area of the workpiece wall surface extending horizontally between the form shoes 14 and 15 will receive equal amounts of deposit material. Disregarding the meandering deposition of beads 22, 23 according to FIG. 2, the workpiece 1 buildup thus takes place in layers of filler material deposited in a successive, helical fashion.

The device of the invention thus makes it possible to produce workpieces of regular and irregular shape through effecting a relative movement between the support device 9 with the workpiece 1, the welding head 12 as well as the form shoes 14 and 15, which can be moved independently from one another.

While there have been described above the principles of this invention in connection with specific apparatus, it is to be clearly understood that this description is made only by way of example and not as a limitation to the scope of the invention.

What is claimed is:

1. An apparatus for building up a workpiece by deposit welding, comprising a support device for the workpiece, a welding head for depositing filler material, a cooled form shoe means for defining the growing workpiece wall, said shoe means including a plurality of cooled form shoes respectively positioned on each side of the workpiece wall, each of said form shoes being independently movable and being movable transversely to said workpiece wall, and means for moving the support device together with the workpiece relative to the welding head and the form shoes.

2. An apparatus for the build up of a workpiece by deposit welding, comprising:
   a support device for the workpiece;
   a welding head for depositing the filler material;
   a cooled form shoe means for defining the growing workpiece wall, said shoe means including a cooled form shoe positioned on each side of the workpiece wall;
   a first movement means for moving the workpiece;
   a second movement means for moving the welding head; and
   a third movement means for moving each of the form shoes independently of each other whereby each of the form shoes is tiltable and movable in a vertical direction.

3. An apparatus for the build up of a workpiece with at least one wall by deposit welding, comprising a support device for the workpiece, a welding head for depositing the filler material, said welding head mounted to a welding head support, a movement means for producing relative movement between the welding head and the support device together with the workpiece, a cooled form shoe positioned on each side of the workpiece wall wherein each of said form shoes defines a portion of the growing workpiece wall, and each of said form shoes is connected to said welding head support by an articulated arm so that each form shoe is movable relative to the workpiece wall.

4. The apparatus of claim 3 wherein each of said form shoes is pivotally connected to its corresponding said arm.

5. The apparatus of claim 3 wherein each of said form shoes is selected from a plurality of possible form shoes each adapted to accommodate a specific contour of the workpiece wall.

* * * * *